United States Patent
Farrenkopf

(10) Patent No.: US 6,952,333 B1
(45) Date of Patent: Oct. 4, 2005

(54) ESD PROTECTION CIRCUIT FOR HIGH-VOLTAGE, HIGH DV/DT PADS

(75) Inventor: Douglas Robert Farrenkopf, Campbell, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 102 days.

(21) Appl. No.: 10/662,607

(22) Filed: Sep. 15, 2003

(51) Int. Cl.[7] ............................................. H02H 9/00
(52) U.S. Cl. ................................................... 361/56
(58) Field of Search .................... 361/56, 91.1, 91.5, 361/118, 111

(56) References Cited

U.S. PATENT DOCUMENTS

| | | | |
|---|---|---|---|
| 4,829,350 A | 5/1989 | Miller | 357/23.13 |
| 5,239,440 A | 8/1993 | Merrill | 361/91 |
| 5,301,084 A | 4/1994 | Miller | 361/91 |
| 5,400,202 A * | 3/1995 | Metz et al. | 361/56 |
| 5,521,789 A | 5/1996 | Ohannes et al. | 361/111 |
| 6,204,715 B1 * | 3/2001 | Sellnau et al. | 327/309 |
| 6,285,536 B1 * | 9/2001 | Holberg et al. | 361/56 |
| 6,400,540 B1 * | 6/2002 | Chang | 361/56 |
| 6,552,886 B1 | 4/2003 | Wu et al. | 361/56 |
| 2003/0147190 A1 * | 8/2003 | Ker et al. | 361/56 |
| 2003/0214773 A1 * | 11/2003 | Kitagawa | 361/118 |

OTHER PUBLICATIONS

Albert Z.H. Wang, "On-Chip ESD Protection For Integrated Circuits", An IC Design Perspective, 2002, pps. 46-47, no month.

* cited by examiner

Primary Examiner—Ronald Leja
(74) Attorney, Agent, or Firm—Mark C. Pickering

(57) ABSTRACT

A pad that experiences a high-voltage, high dV/dT signal during normal operation is prevented from falsely triggering by utilizing a bipolar transistor connected to the pad to provide ESD protection, and a MOS transistor connected to the bipolar transistor to turn off the bipolar transistor during normal circuit operation.

12 Claims, 1 Drawing Sheet

ESD PROTECTION CIRCUIT FOR HIGH-VOLTAGE, HIGH DV/DT PADS

DETAILED DESCRIPTION OF THE INVENTION

Figure 1:
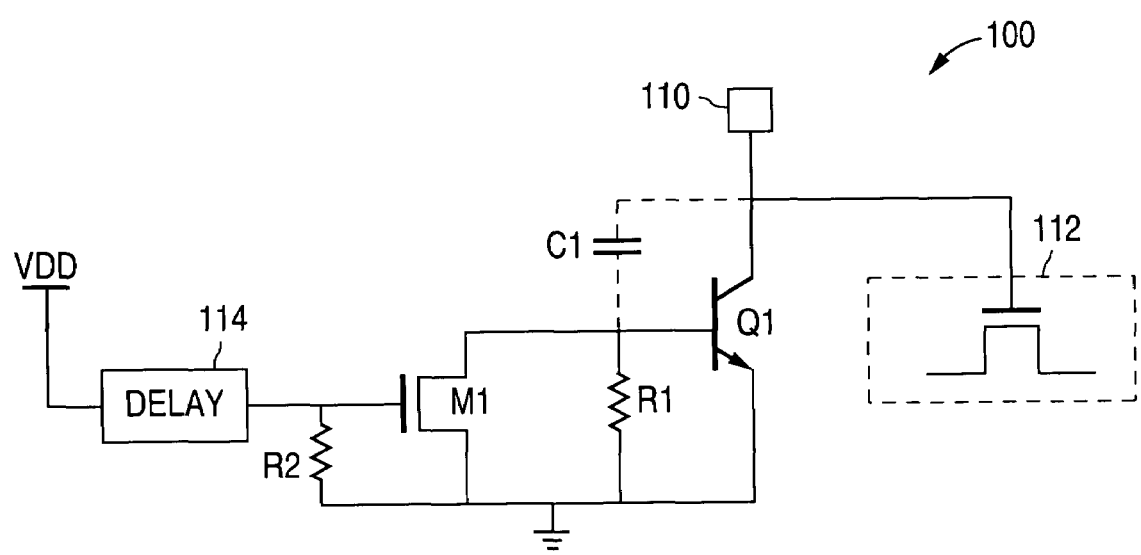
FIG. 1 is a schematic view illustrating an example of an ESD protection circuit 100 in accordance with the present invention.

FIG. 1 shows a schematic view that illustrates an example of an electrostatic discharge (ESD) protection circuit 100 in accordance with the present invention. As described in greater detail below, circuit 100 utilizes a bipolar transistor that is connected to a pad to provide ESD protection for the pad, and a MOS transistor that is connected to the bipolar transistor to turn off the bipolar transistor during normal circuit operation.

As shown in FIG. 1, ESD protection circuit 100 includes a pad 110, and a bipolar transistor Q1 that has a collector connected to pad 110, a base, and an emitter connected to a ground line. In addition, as shown by the dashed lines, transistor Q1 also has a parasitic base-to-collector capacitance C1. (Capacitance C1 can be increased by connecting a capacitor between and to the base and collector of transistor Q1.)

ESD protection circuit 100 further includes a resistor R1 that is formed between the base and emitter of transistor Q1, a to-be-protected 112 circuit, and a MOS transistor M1. To-be-protected circuit 112 can be, for example, the gate of a MOS transistor. MOS transistor M1, in turn, has a drain that is connected to the base of transistor Q1, a gate, and a source that is connected to the ground line.

In addition, ESD protection circuit 100 includes a resistor R2 that is connected between the gate of transistor M1 and the ground line, and a delay line 114 that is connected to the gate of transistor M1. Delay line 114, which can be implemented as, for example, an RC delay of approximately one microsecond, is also connected to a power supply line VDD.

In operation, when an ESD event occurs on pad 110 with respect to the ground line, the voltage on pad 110 rises quickly which, in turn, causes the voltage on the base of transistor Q1 to also rise quickly due to the base-to-collector capacitance, thereby turning on transistor Q1. When transistor Q1 turns on, transistor Q1 provides a low impedance path from pad 110 (the pad experiencing the ESD event) to the ground line. As a result, transistor Q1 is able to absorb the large ESD current pulse while keeping the voltage on pad 110 sufficiently low enough as to not damage to-be-protected circuit 112.

In the present example, transistor Q1 is a high-voltage transistor that is formed to not breakdown when, for example, a normal operating voltage of 50V is placed on pad 110. When a lower normal operating voltage is used, such as 1.8V, transistor Q1 can be formed so that, when an ESD event occurs, the rising voltage on pad 110 breaks down the reverse-biased base-to-collector junction. The broken down junction, in turn, injects holes into the base of transistor Q1. The increased number of holes and the resulting current flow through resistor R1 causes the voltage on the base of bipolar transistor Q1 to rise quickly, thereby turning on transistor Q1.

In the event that pad 110 and the pad that provides the supply voltage VDD are the same pad and are zapped and experience an ESD event, delay line 114 provides a delay that is longer than the ESD event, which is approximately one microsecond. Thus, by the time that any voltage due to the ESD event has propagated through delay line 114 to transistor M1, transistor Q1 has already turned on and discharged the ESD event.

Once a chip that includes ESD protection circuit 100 has been installed in a circuit board and power has been provided to the board, the supply voltage VDD turns on transistor M1 which, in turn, pulls the voltage on the base of transistor Q1 to zero. When the voltage on the base of transistor Q1 is pulled to zero, transistor Q1 is turned off.

As a result, when high-voltage signals with a very fast rising edge (high dV/dt) are received on pad 110, even signals with a rising edge that is less than one microsecond, transistor Q1 is prevented from turning on since the base of transistor Q1 has been pulled to ground. As a result, fast and noisy high-voltage signals on pad 110 are prevented from falsely triggering transistor Q1.

Circuit 100 does not protect to-be-protected circuit 112 from ESD events during normal circuit operation. ESD events, however, typically happen to chips during handling or circuit board assembly, and not while the chips are permanently fixed in a printed circuit board and operating normally.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. An ESD protection circuit comprising:
   a pad;
   a to-be-protected circuit connected to the pad;
   a MOS transistor having a drain, a source, and a gate; and
   an npn bipolar junction transistor having a collector connected to the pad, an emitter connected to a ground line, and a base connected to the drain, only a single drain being connected to the base.

2. The ESD protection circuit of claim 1 and further comprising a delay line having an input, and an output connected to the gate of the MOS transistor.

3. The ESD protection circuit of claim 2 and further comprising a resistive device connected to the base and the ground line.

4. The ESD protection circuit of claim 2 and further comprising:
   a first resistive device connected to the base and the ground line; and
   a second resistive device connected to the gate and the ground line.

5. The ESD protection circuit of claim 2 wherein the input of the delay line is connected to a power supply pad.

6. The ESD protection circuit of claim 2 wherein the delay line has a delay period required for a signal to pass through the delay line, the delay period being greater than a period of an ESD event.

7. An ESD protection circuit comprising:
   a pad;
   a to-be-protected circuit connected to the pad;
   an NMOS transistor having a drain, a source, and a gate; and
   an npn bipolar junction transistor having a collector connected to the pad, an emitter connected to a ground line, and a base connected to the drain, no PMOS transistor being connected to the base.

8. The ESD protection circuit of claim 7 and further comprising a delay line having an input, and an output connected to the gate of the NMOS transistor.

9. The ESD protection circuit of claim 8 and further comprising a resistive device connected to the base and the ground line.

10. The ESD protection circuit of claim 8 and further comprising:
   a first resistive device connected to the base and the ground line; and
   a second resistive device connected to the gate and the ground line.

11. The ESD protection circuit of claim 8 wherein the input of the delay line is connected to a power supply pad.

12. The ESD protection circuit of claim 8 wherein the delay line has a delay period required for a signal to pass through the delay line, the delay period being greater than a period of an ESD event.

* * * * *